(12) United States Patent
Roberts

(10) Patent No.: US 11,814,023 B2
(45) Date of Patent: Nov. 14, 2023

(54) SEALING ASSEMBLY FOR A SPRING BRAKE ACTUATOR

(71) Applicant: Bendix Commercial Vehicle Systems LLC, Elyria, OH (US)

(72) Inventor: Will E Roberts, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 534 days.

(21) Appl. No.: 17/007,037

(22) Filed: Aug. 31, 2020

(65) Prior Publication Data

US 2022/0063580 A1   Mar. 3, 2022

(51) Int. Cl.
| | |
|---|---|
| *B60T 17/08* | (2006.01) |
| *B60T 13/46* | (2006.01) |
| *F16D 65/28* | (2006.01) |
| *F01B 31/26* | (2006.01) |
| *F16D 121/10* | (2012.01) |
| *F16D 125/08* | (2012.01) |

(52) U.S. Cl.
CPC ............ *B60T 17/08* (2013.01); *B60T 13/46* (2013.01); *B60T 17/083* (2013.01); *B60T 17/085* (2013.01); *F16D 65/28* (2013.01); *F16D 2121/10* (2013.01); *F16D 2125/08* (2013.01)

(58) Field of Classification Search
CPC ...... B60T 17/083; B60T 17/085; F16D 65/28; F16D 2121/10
See application file for complete search history.

(56) References Cited

U.S. PATENT DOCUMENTS

| | | | | |
|---|---|---|---|---|
| 3,495,503 A | * | 2/1970 | Gummer | B60T 17/086 92/64 |
| 3,973,805 A | * | 8/1976 | Stevenson | B60T 17/16 188/170 |
| 3,983,790 A | | 10/1976 | Johannesen | |

(Continued)

FOREIGN PATENT DOCUMENTS

| | | |
|---|---|---|
| EP | 0009961 A1 | 4/1980 |
| EP | 0123866 A1 | 11/1984 |

(Continued)

OTHER PUBLICATIONS

Bendix Spicer Foundation Brake LLC, "SD-02-4525, Bendix Endurasure and EnduraSure-Pro spring brake chambers," Service Data Sheet, Oct. 2017, 12 pages, Bendix Spicer Foundation Brake LLC, Elyria Ohio, United States of America.

(Continued)

*Primary Examiner* — Melody M Burch
(74) *Attorney, Agent, or Firm* — Cheryl L. Greenly; Brian E. Kondas

(57) ABSTRACT

A sealing assembly for installation on a port of a spring brake actuator includes a plug, a one-way valve and a cap. The plug receives the one-way valve for providing one-way air flow through the orifices and maintaining about two psi in the spring brake chamber at zero stroke. An elastomeric piece is affixed to a first set of segments of the plug for sealing against an inner surface of the port. The cap has arms sized to extend around a third set of segments of the plug and snap onto the plug. A fourth set of segments of the plug elastically deform so the sealing assembly can be installed and removed from the port easily.

14 Claims, 4 Drawing Sheets

(56) References Cited

U.S. PATENT DOCUMENTS

| | | | |
|---|---|---|---|
| 4,890,540 A * | 1/1990 | Mullins | B60T 17/083 |
| | | | 92/63 |
| 5,372,059 A | 12/1994 | Pierce | |
| 5,722,311 A | 3/1998 | Pierce | |
| 5,836,233 A | 11/1998 | Rumsey | |
| 5,873,297 A | 2/1999 | Stojic | |
| 6,378,414 B1 | 4/2002 | Constantinides | |
| 6,389,954 B1 | 5/2002 | Constantinides | |
| 6,907,818 B2 | 6/2005 | Anderson | |
| 8,714,318 B2 | 5/2014 | Darner | |
| 9,550,485 B2 | 1/2017 | Spath | |
| 9,586,567 B2 | 3/2017 | Derouault | |

FOREIGN PATENT DOCUMENTS

| | | | | |
|---|---|---|---|---|
| GB | 2261471 A * | 5/1993 | | B60T 17/083 |
| WO | WO-9720153 A1 * | 6/1997 | | B60T 17/085 |

OTHER PUBLICATIONS

European Patent Office, "Written Opinion of the International Searching Authority and Search Report," Report, dated Dec. 8, 2021, 11 pages, European Patent Office, Rijswijk, Netherlands.

* cited by examiner

SEALING ASSEMBLY FOR A SPRING BRAKE ACTUATOR

BACKGROUND

The present application relates to a sealing assembly for a spring brake actuator. Spring brake actuators are used in commercial vehicle air brake systems. Each air brake system may include at least two spring brake actuators installed on opposite wheel ends. A common type of spring brake actuator has a housing defining a service brake portion having a service brake chamber and a parking brake portion having a parking brake chamber and a spring brake chamber. For service braking, compressed air is selectively introduced into the service brake chamber to move a piston, push an actuator rod, and thereby operate the service brake system. In the parking brake chamber, introducing compressed air moves a second piston, which compresses a power spring and allows the actuator rod to retract into the housing, thereby unparking the vehicle. The spring brake actuator sets the vehicle parking brakes when requested by the driver by exhausting the compressed air from the parking brake chamber, thereby allowing the power spring located in the spring brake chamber to extend. The spring brake actuator may also be set automatically when compressed air above a predetermined pressure is no longer provided to the parking brake chamber.

The parking brake portion of the spring brake actuator will often include an aperture permitting access to the spring brake chamber in order to permit manual release of the parking brake. Internal components may degrade over time from fluids and other contaminants that enter the housing through such apertures. In order to address this issue, some spring brake actuators employ vent holes to permit contaminants to escape from the housing. However, these vent holes often become a source of contaminant entry and may become clogged. Other spring brake actuators attempt to seal apertures in the housing to prevent contaminants from entering the housing. These latter spring brake actuators frequently employ a dust plug that is inserted in the aperture when the aperture is not in use. Conventional dust plugs, however, are frequently discarded by vehicle operators and maintenance personnel following removal of the dust plug during regular maintenance. These dust plugs can be difficult to reinstall. Further, if an individual does reinstall the dust plug, the dust plug is often installed incorrectly. Conventional dust plugs are also subject to displacement by vibration during normal vehicle operation. Accordingly, those skilled in the art continue with research and development efforts in the field of spring brake actuator designs and means to seal spring brake actuators.

SUMMARY

In accordance with one embodiment, a sealing assembly for a spring brake actuator comprises a plug, a one-way valve and a cap. The plug comprises a circular planar section having a central opening and at least two orifices arranged outside an outer diameter of the central opening. The plug includes a first set of segments on a first surface of the circular planar section arranged to fit within an inner diameter of a port of the spring brake actuator, a second set of segments on the first surface of the circular planar section arranged to fit outside an outer diameter of the port of the spring brake actuator, an elastomeric piece affixed between the first set of segments and the second set of segments for sealing against an inner surface of the port, a third set of segments on a second surface of the circular planar section arranged to receive a cap and a fourth set of segments arranged around the outer circumference of the circular planar section defining the length of the plug, each of the fourth set of segments having a curved portion at one end and a protrusion at an opposite end. The one-way valve fits in the central opening for providing one-way air flow through the at least two orifices. The cap has arms sized to extend around the third set of segments and snap onto the first surface of the circular planar section, wherein the cap forms a chamber when mated with the plug.

In another embodiment, a spring brake actuator for an air brake system comprises a housing defining a spring brake chamber, an aperture in the spring brake chamber of the housing and a port affixed to the spring brake chamber of the housing for providing access to the aperture. The port has a smooth inner surface and a groove on an outer surface. A sealing assembly is installed on the port. The sealing assembly comprises a plug, a one-way valve and a cap. The plug includes a circular planar section having a central opening and at least two orifices around outside an outer diameter of the central opening. The plug includes a first set of segments on a first surface of the circular planar section arranged to fit within an inner diameter of a port, a second set of segments on the first surface of the circular planar section arranged to fit outside an outer diameter of the port, an elastomeric piece molded to the first set of segments for sealing against the smooth inner surface of the port, a third set of segments on a second surface of the circular planar section arranged to receive a cap and a fourth set of segments arranged around the outer circumference of the circular planar section defining the length of the plug, each of the fourth set of segments having a curved portion at one end and a protrusion at an opposite end for fitting within the groove of the port. The one-way valve fits in the central opening for providing one-way air flow through the at least two orifices. The cap has arms sized to extend around the third set of segments and snap onto the first surface of the circular planar section, wherein the cap forms a chamber when mated with the plug.

In another embodiment, a method of operating a spring brake actuator comprises installing a sealing assembly to a port of the spring brake chamber of a spring brake actuator. The sealing assembly comprises a one-way valve for providing one-way air flow. The method comprises setting the spring brake actuator at zero stroke, wherein the sealing assembly maintains about two psi of air in the spring brake chamber. The method further comprises setting the spring brake actuator at normal stroke, wherein the sealing assembly exhausts air from the spring brake chamber through the one-way valve to maintain about zero psi in the spring brake chamber.

DETAILED DESCRIPTION

Figure 1:
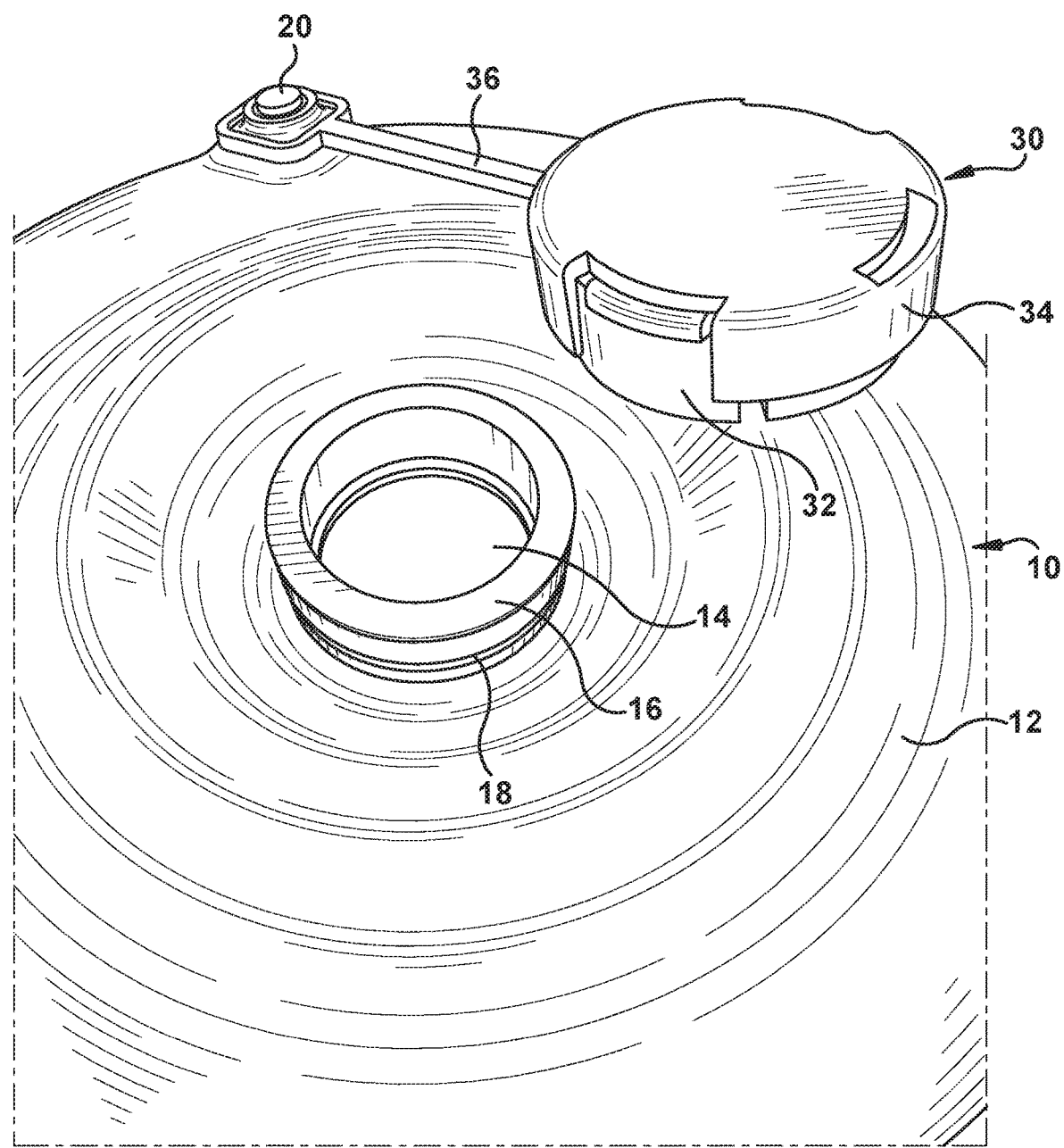
FIG. 1 is a representation of a portion of spring brake actuator having a sealing assembly of the present invention.

Referring to FIG. 1, a spring brake actuator 10 having a housing 12 that defines a spring brake chamber is shown.

The parking brake chamber (not shown) of the parking brake portion receives a pneumatic input to compress a power spring (not shown) located in the spring brake chamber, thereby holding the parking brakes in the unparked position. This spring brake chamber is sealed to prevent moisture and contaminants from entering. However, air trapped in the spring brake chamber when the power spring is released must be allowed to be vented to ensure proper operation of the parking brakes. In addition, the power spring inside the spring brake chamber must be accessed to be caged if maintenance is needed to be completed on the spring brake actuator or accompanying brake system. Therefore, access through the housing 12 must be present for this purpose as well.

The housing 12 defining the spring brake chamber of a parking brake section of the spring brake actuator 10 is generally a metallic material, such as aluminum or steel. The housing 12 includes an aperture 14 that is used as an access point for a tool used in caging the power spring located inside the housing 12. The aperture 14 also serves to release air from the spring brake chamber.

Port 16 is affixed to the housing 12 and surrounds the aperture 14. The port 16 may be the same metallic material as the housing 12 or it may be a different metallic material. The port 16 includes a smooth inner surface and a groove 18 around an outer circumference of the port 16. The port 16 may be welded to the housing 12 or otherwise staked. No machining of the port 16 is required after welding to the housing 12.

The housing 12 may also include a post 20 affixed to the housing 12. The post 20 may be a metallic material or other material.

Sealing assembly 30 is an example of a simple to install assembly that seals the housing 12 against moisture and contaminants while allowing pressurized air from the spring brake chamber to vent to atmosphere. The sealing assembly 30 is depicted as disengaged from the port 16.

The sealing assembly 30 includes a plug 32 and a cap 34. The cap 34 may have a tether 36. In order to keep the sealing assembly 30 near the housing 12 when disengaged, the tether 36 affixes to the post 20 by sliding the tether 36 over the post 20. The aperture 14 can then be accessed by a technician with the proper tools without interference from the sealing assembly 30. The sealing assembly 30 will not be misplaced while it remains affixed to the post 20.

Figure 2A:
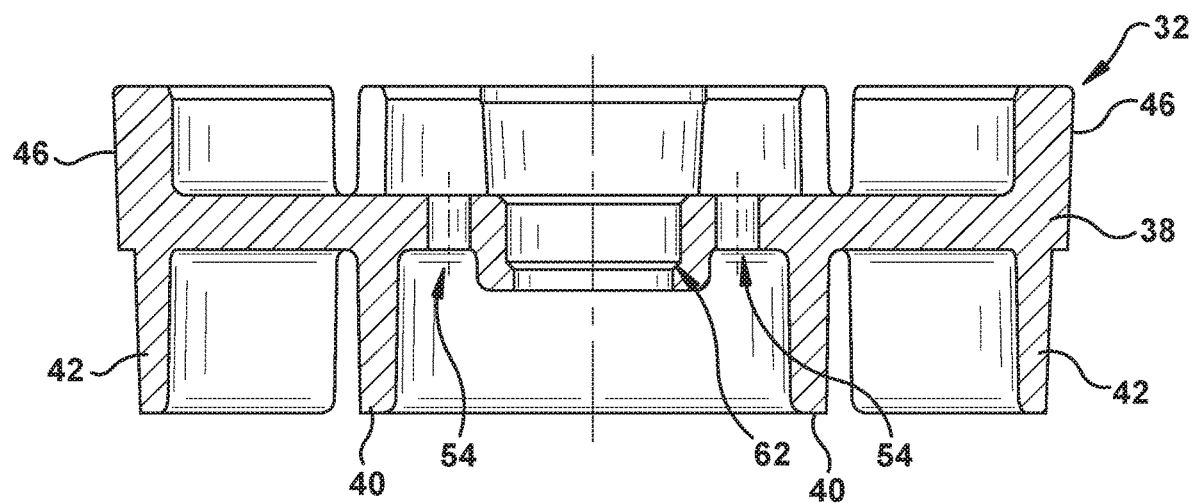
FIGS. 2A and 2B are each a cross-section of a plug that is part of the inventive sealing assembly.

FIG. 2A depicts an enlarged cross-section in a first view of the plug 32 of the sealing assembly 30.

The plug 32 comprises a circular planar section 38. The circular planar section 38 has a central opening 62. The circular planar section 38 also includes at least two orifices 54 arranged outside the outer diameter of the central opening 62. The diameter of the at least two orifices 54 is less than the diameter of the central opening 62.

The plug 32 includes a first set of segments 40 extending outward from a first surface of the circular planar section 38. The first set of segments 40 are arranged axially outside the location of the at least two orifices 54.

The plug 32 includes a second set of segments 42 arranged near the outer circumference of the first surface of the circular planar section 38. The second set of segments 42 are approximately the same length as the first set of segments 40.

The plug 32 includes a third set of segments 46 arranged around the outer circumference of a second surface of the circular planar section 38, opposite the first surface. The third set of segments 46 extend outward from the circular planar section 38.

Figure 2B:
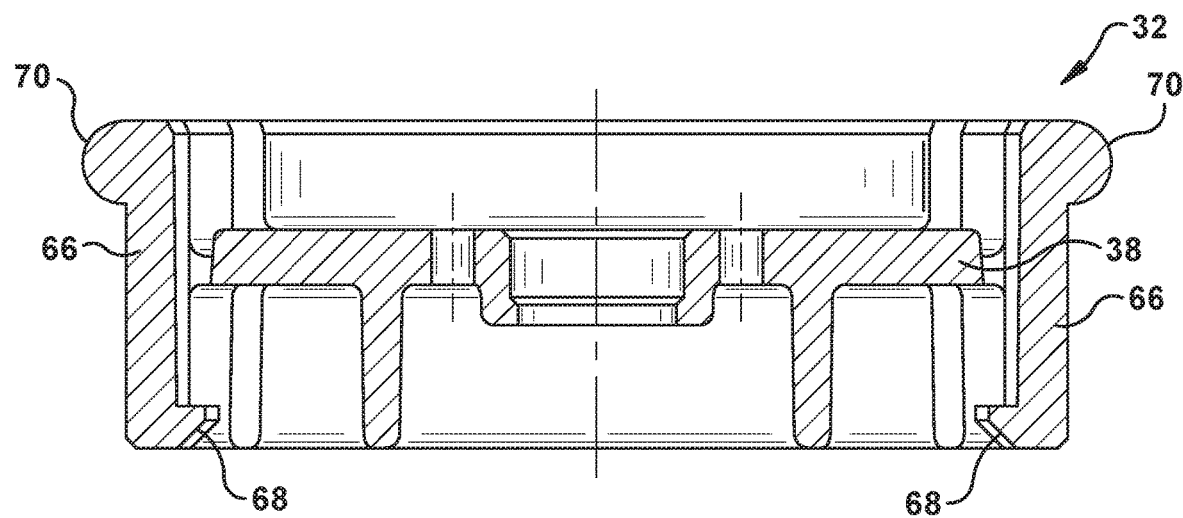

FIG. 2B depicts an enlarged cross-section in a view of the plug 32 of the sealing assembly 30 arranged ninety degrees from the view shown in FIG. 2A.

The plug 32 includes a fourth set of segments 66 arranged around the outer circumference of the circular planar section 38. The fourth set of segments 66 define the full length of the plug 32 and are elastically deformable. The fourth set of segments 66 include a protrusion 68 at the end extending from the first surface and a curved portion 70 extending from the second surface. The fourth set of segments 66 may include a living hinge such that when the curved portion 70 is pressed inward, the protrusion 68 moves outward.

Figure 3A:
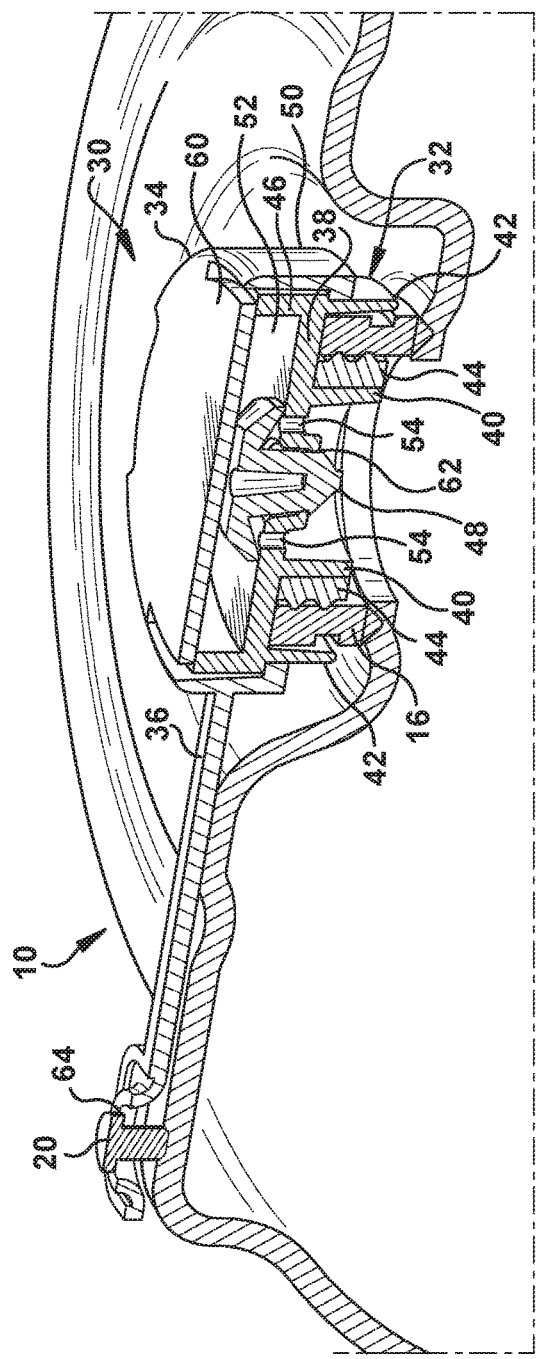
FIGS. 3A and 3B are each a cross-section of the inventive sealing assembly having the plug as in FIGS. 2A and 2B as installed on the spring brake actuator.

FIG. 3A depicts a cross-section in a first view of the spring brake actuator 10 having the sealing assembly 30 as installed on the port 16.

The first set of segments 40 of the plug 32 extend partially into an inner diameter of the port 16 when the sealing assembly 30 is installed on the port 16. The second set of segments 42 are arranged to partially surround the outer diameter of the port 16 when the sealing assembly 30 is installed.

The plug 32 includes an elastomeric piece 44 affixed between the first set of segments 40 and the second set of segments 42. The elastomeric piece 44 may be overmolded directly to the first set of segments 40. The elastomeric piece 44 is shaped to be fully within the inner diameter of the port 16 when the sealing assembly 30 is installed. The elastomeric piece 44 will seal against the smooth inner surface of the port 16. The elastomeric piece 44 may be of silicon, rubber or other material having similar flexibility. The elastomeric piece 44 may be molded to include ribs along its outer diameter to improve the seal against the inner surface of the port 16. No additional seals, such as O-rings found on prior art spring brake actuators dust plugs, are required.

The sealing assembly 30 includes a one-way valve 48. The one-way valve 48 is frictionally fit in the central opening 62 of the circular planar section 38. The one-way valve 48 is designed to cover the at least two orifices 54 when in the at rest position. The one-way valve 48 may be an umbrella valve. The one-way valve 48 may be made of a silicone or similar material. The one-way valve 48 allows air to flow through the at least two orifices 54 out of the spring brake chamber when the pressure in the spring brake chamber is between about one psi and about three psi. The shape and structure of the one-way valve 48 may be adjusted to provide different opening pressures (crack pressures).

The sealing assembly 30 includes the cap 34. The cap includes a planar section 60 and arms 50 arranged to surround the third set of segments 46 of the plug 32. Arms 50 of the cap 34 are shaped to facilitate snap fitting the cap 34 to plug 32. A chamber 52 is formed between the circular planar section 38 and the cap 34 when the cap 34 is snap-fit onto the plug 32. Air escapes the chamber 52 to atmosphere around the planar section 60 of cap 34 when the one-way valve 48 is open.

The cap 34 may also include the tether 36. The tether 36 extends from the cap 34 across the body of the actuator housing 12 to the post 20. An aperture 64 on the distal end of the tether 36 fits over the post 20. When the sealing assembly 30 is uninstalled, it can be pivoted around the post 20.

The material of the plug 32 and the cap 34 may be the same elastically deformable material, such as nylon or ABS plastic. The material selected should be stable with exposure to ultraviolet light and impact resistant. Alternatively, the plug 32 may be a glass filled plastic to improve the ability to withstand the overmolding process. The plug 32 and the cap 34 are assembled together easily by snapping the cap 34 over the plug 32 prior to the sealing assembly 30 being installed on the port 16. Once snapped together, the cap 34 will not need to be unsnapped from the plug 32. The assembly of the cap 34 to the plug 32 could also be accomplished by including living hinges as part of the arms 50 of the cap 34.

Figure 3B:
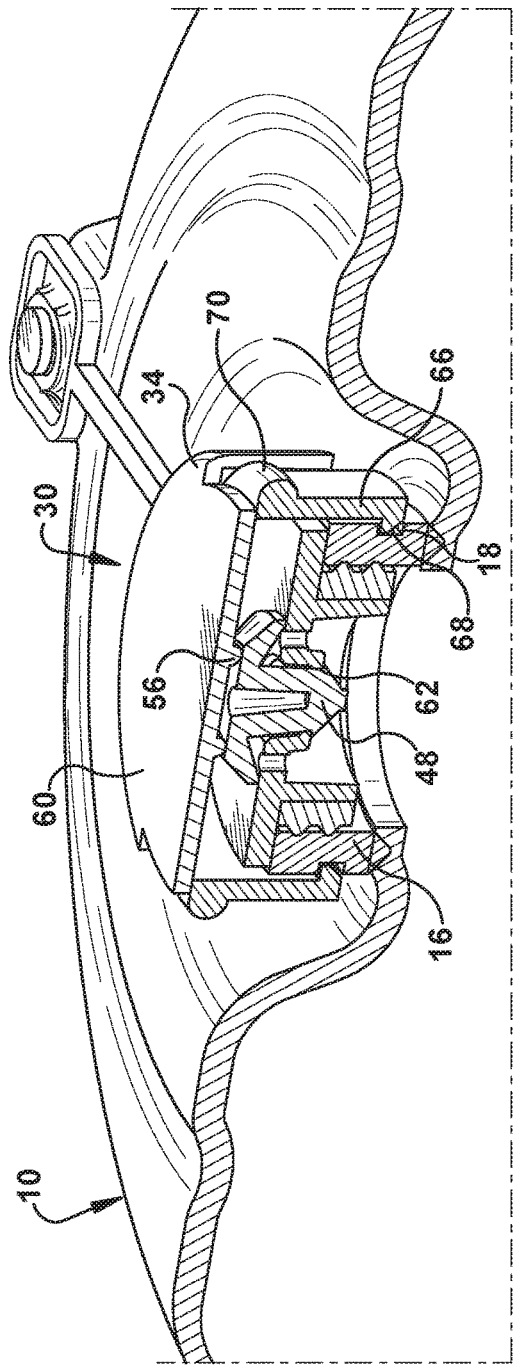

FIG. 3B depicts a cross-section of the sealing assembly 30 as installed on the port 16 in a second view, approximately ninety degrees from the first view of FIG. 3A.

Ridges 56 on the planar section 60 of the cap 34 abut the one-way valve 48 and assist in holding the one-way valve 48 in the central opening 62 when installed.

The curved portion 70 and protrusion 68 of the fourth set of segments 66 facilitate the attachment and removal of the sealing assembly 30 from the port 16. The fourth set of segments 66 affix to the groove 18 on the outer diameter of the port 16, such as by the protrusion 68 snap fitting into the groove 18. The sealing assembly 30 is held onto the port 16 by this feature throughout the operation of the actuator. The sealing assembly 30 can easily be released by pressing inward on curved portion 70, which in turn will release the protrusion 68 from the groove 18. The sealing assembly 30 is reusable for multiple installations onto the spring brake actuator 10.

No special tools are required to insert the one-way valve 48 into the plug 32 and to assemble the cap 34 to the plug 32. No special tools are required to install the sealing assembly 30 onto the port 16. The sealing assembly 30 remains on port 16 throughout normal operation of the actuator and is impervious to debris or rust. The spring brake actuator 10 is now easily serviceable. No additional machining process is required for the port 16 before or after welding or staking to the housing 12, since no threads are required.

Therefore, a sealing assembly for a spring brake actuator comprises a plug, a one-way valve and a cap. The plug comprises a circular planar section having a central opening and at least two orifices arranged outside an outer diameter of the central opening. The plug includes a first set of segments on a first surface of the circular planar section arranged to fit within an inner diameter of a port of the spring brake actuator, a second set of segments on the first surface of the circular planar section arranged to fit outside an outer diameter of the port of the spring brake actuator, an elastomeric piece affixed between the first set of segments and the second set of segments for sealing against an inner surface of the port, a third set of segments on a second surface of the circular planar section arranged to receive a cap and a fourth set of segments arranged around the outer circumference of the circular planar section defining the length of the plug, each of the fourth set of segments having a curved portion at one end and a protrusion at an opposite end. The one-way valve fits in the central opening for providing one-way air flow through the at least two orifices. The cap has arms sized to extend around the third set of segments and snap onto the first surface of the circular planar section, wherein the cap forms a chamber when mated with the plug.

Therefore, a spring brake actuator for an air brake system comprises a housing defining a spring brake chamber, an aperture in the spring brake chamber of the housing and a port affixed to the spring brake chamber of the housing for providing access to the aperture. The port has a smooth inner surface and a groove on an outer surface. A sealing assembly is installed on the port. The sealing assembly comprises a plug, a one-way valve and a cap. The plug includes a circular planar section having a central opening and at least two orifices around outside an outer diameter of the central opening. The plug includes a first set of segments on a first surface of the circular planar section arranged to fit within an inner diameter of a port, a second set of segments on the first surface of the circular planar section arranged to fit outside an outer diameter of the port, an elastomeric piece molded to the first set of segments for sealing against the smooth inner surface of the port, a third set of segments on a second surface of the circular planar section arranged to receive a cap and a fourth set of segments arranged around the outer circumference of the circular planar section defining the length of the plug, each of the fourth set of segments having a curved portion at one end and a protrusion at an opposite end for fitting within the groove of the port. The one-way valve fits in the central opening for providing one-way air flow through the at least two orifices. The cap has arms sized to extend around the third set of segments and snap onto the first surface of the circular planar section, wherein the cap forms a chamber when mated with the plug.

When a spring brake actuator is assembled, some pressurized air remains in the spring brake chamber. During operation of the prior art spring brake actuators, normally approximately zero pounds per square inch (psi) of pressure in the parking brake section is present at zero stroke of the actuator rod (when the vehicle is parked). At the normal parking stroke, which is about 1.25 inches, a vacuum would form of about three psi. The presence of the vacuum equates to a reduction in available force to park of about ninety pounds force (lbf). Spring brake actuators are required to continue to apply a force throughout the full stroke of the actuator rod with a recommended SAE tolerance band of 300 lbf. At full stroke, the vacuum in the spring brake chamber could be about nine psi. This negative pressure equates to about 270 lbf loss in parking force when using a Type 30 (30 cubic inch volume) parking brake chamber, which is almost the entire tolerance band. Some prior art spring brake actuators make up for this reduction in force by using a larger power spring in order to maintain the required force output through the entire stroke. In the present spring brake actuator, zero psi is not desired in the spring brake chamber at zero stroke.

Figure 4:
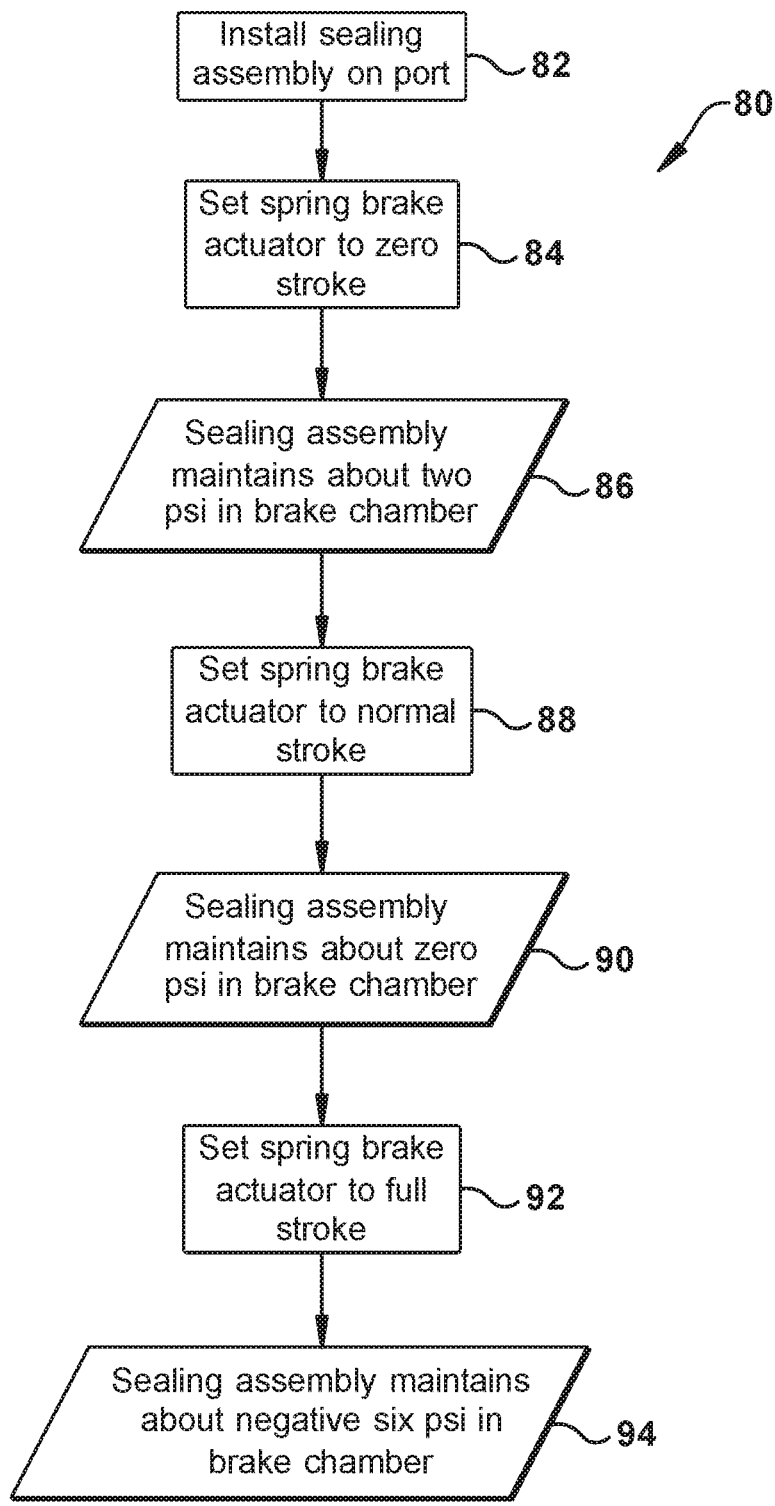
FIG. 4 is a method of operating a spring brake actuator having the inventive sealing assembly.

FIG. 4 discloses a method 80 of operating the spring brake actuator 10 having the present inventive sealing assembly 30. At full stroke with the present one-way valve 48 in operation, a lower pressure vacuum would be formed that would not detrimentally affect the force output of the parking brake spring. Prior art one-way valves used in spring brake actuators do not have a minimum opening pressure (crack pressure) and tend to exhaust all of the pressure from the spring brake chamber.

In step 82, the sealing assembly 30 is installed on the port 16. In step 84, the spring brake actuator 10 is set to zero stroke. In step 86, the inventive sealing assembly 30 maintains a small positive pressure of about two psi in the spring brake chamber at zero stroke. Then, throughout the stroke of the spring brake actuator, the vacuum pressure created in the spring brake chamber will be reduced from prior art spring brake actuators.

In step 88, the spring brake actuator 10 is set to a normal stroke, such as a standard parking stroke of about 1.25". In step 90, the sealing assembly 30 maintains about zero pressure in the spring brake chamber. At zero pressure, there is no reduction in force output of the spring brake actuator 10. Zero pressure is possible at normal stroke because of the initial opening pressure setting of the one-way valve 48, which does not exhaust all of the pressure out of the spring brake chamber at zero stroke.

In step 92, the spring brake actuator is set to a full stroke. In step 94, the sealing assembly maintains a vacuum of about 6 psi, causing a reduction in available force of about 180 lbf. However, this is a 90 lbf improvement over prior art spring brake actuators. The remaining tolerance band for operation of the spring brake actuator is then 120 lbf, and not 30 lbf as in the prior art spring brake actuators. The size and material of the power spring used in this inventive spring brake actuator assembly can be lighter weight since there is less expected force output loss.

Another advantage of the sealing assembly 30 is if there is a leak in the spring brake chamber, the positive chamber pressure enabled by the sealing assembly 30 will tend to expel any contaminants rather than draw them into the spring brake chamber.

Therefore, a method of operating a spring brake actuator comprises installing a sealing assembly to a port of the spring brake chamber of a spring brake actuator. The sealing assembly comprises a one-way valve for providing one-way air flow. The method comprises setting the spring brake actuator at zero stroke, wherein the sealing assembly maintains about two psi of air in the spring brake chamber. The method further comprises setting the spring brake actuator at normal stroke, wherein the sealing assembly exhausts air from the spring brake chamber through the one-way valve to maintain about zero psi in the spring brake chamber.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A sealing assembly for a spring brake actuator comprising:
    a plug, the plug comprising
        a circular planar section having a central opening and at least two orifices arranged outside an outer diameter of the central opening;
        a first set of segments on a first surface of the circular planar section arranged to fit within an inner diameter of a port of the spring brake actuator;
        a second set of segments on the first surface of the circular planar section arranged to fit outside an outer diameter of the port of the spring brake actuator;
        an elastomeric piece affixed between the first set of segments and the second set of segments for sealing against an inner surface of the port;
        a third set of segments on a second surface of the circular planar section arranged to receive a cap; and
        a fourth set of segments arranged around the outer circumference of the circular planar section defining the length of the plug, each of the fourth set of segments having a curved portion at one end and a protrusion at an opposite end; and
        a one-way valve fit in the central opening for providing one-way air flow through the at least two orifices; and
    a cap, the cap having arms sized to extend around the third set of segments and snap onto the first surface of the circular planar section, wherein the cap forms a chamber when mated with the plug.

2. The sealing assembly as in claim 1, wherein the cap further comprises a tether, the tether having an aperture for affixing to a post on the spring brake actuator.

3. The sealing assembly as in claim 1, wherein the cap further comprises ridges on an inner surface that abut the one-way valve when the cap is installed on the plug.

4. The sealing assembly as in claim 1, wherein the sealing assembly allows air in the chamber to communicate with atmosphere.

5. The sealing assembly as in claim 1, wherein the one-way valve is an umbrella valve.

6. The sealing assembly as in claim 1, wherein the elastomeric piece is a silicone material overmolded to the first set of segments of the plug.

7. The sealing assembly as in claim 6, wherein the elastomeric piece is molded to include ribs on the outer diameter of the elastomeric piece to seal against the inner surface of the port.

8. The sealing assembly as in claim 1, wherein the plug and the cap are constructed of the same elastically deformable material.

9. The sealing assembly as in claim 1, wherein the fourth set of segments elastically deform to fit over the outer diameter of the port when pressed at the curved portion of at least one of the fourth set of segments and the protrusions of all of the fourth set of segments snaps into a groove on the outer surface of the port when installed on the port.

10. A spring brake actuator for an air brake system comprising:
    a housing defining a spring brake chamber;
    an aperture in the spring brake chamber of the housing;
    a port affixed to the spring brake chamber of the housing for providing access to the aperture, the port having a smooth inner surface and a groove on an outer surface;
    a sealing assembly installed on the port, the sealing assembly comprising:
        a plug, the plug comprising
        a circular planar section having a central opening and at least two orifices arranged outside an outer diameter of the central opening;
        a first set of segments on a first surface of the circular planar section arranged to fit within an inner diameter of the port;
        a second set of segments on the first surface of the circular planar section arranged to fit outside an outer diameter of the port and affix to the groove of the port;
        an elastomeric piece molded to the first set of segments for sealing against the smooth inner surface of the port;
        a third set of segments on a second surface of the circular planar section arranged to receive a cap;
        a fourth set of segments arranged around the outer circumference of the circular planar section defining the length of the plug, each of the fourth set of segments having a curved portion at one end and a protrusion at an opposite end for fitting within the groove of the port;
        a one-way valve fit in the central opening for providing one-way air flow through the at least two orifices; and
    a cap, the cap having arms sized to extend around the third set of segments and snap onto the first surface of the circular planar section, wherein the cap forms a chamber when mated with the plug.

11. The spring brake actuator as in claim 10, wherein the port is staked to the housing.

12. The spring brake actuator as in claim 10, wherein the cap further comprises a tether and the housing further comprises a post for receiving a distal end of the tether.

13. The spring brake actuator as in claim 10, wherein the one-way check valve maintains a positive pressure in the spring brake chamber of about two pounds per square inch in response to the spring brake actuator being at zero stroke.

14. The spring brake actuator as in claim 10, wherein the plug and the cap are constructed of elastically deformable materials and the housing and the port are metallic materials.

\* \* \* \* \*